United States Patent
He et al.

(10) Patent No.: US 11,211,075 B2
(45) Date of Patent: Dec. 28, 2021

(54) SERVICE CONTROL METHOD, SERVICE CONTROL APPARATUS AND DEVICE

(71) Applicants: BAIDU ONLINE NETWORK TECHNOLOGY (BEIJING) CO., LTD., Beijing (CN); SHANGHAI XIAODU TECHNOLOGY CO., LTD, Shanghai (CN)

(72) Inventors: Liang He, Beijing (CN); Aihui An, Beijing (CN); Yu Niu, Beijing (CN); Lifeng Zhao, Beijing (CN); Xiangdong Xue, Beijing (CN); Ji Zhou, Beijing (CH)

(73) Assignees: BAIDU ONLINE NETWORK TECHNOLOGY (BEIJING) CO., LTD.; SHANGHAI XIAODU TECHNOLOGY CO. LTD.

(*) Notice: Subject to any disclaimer, the term of this patent is extended or adjusted under 35 U.S.C. 154(b) by 167 days.

(21) Appl. No.: 16/667,951

(22) Filed: Oct. 30, 2019

(65) Prior Publication Data
US 2020/0227051 A1  Jul. 16, 2020

(30) Foreign Application Priority Data
Jan. 11, 2019 (CN) .......................... 201910025214.7

(51) Int. Cl.
*G10L 15/00* (2013.01)
*G10L 17/22* (2013.01)
*G10L 15/22* (2006.01)
*G10L 15/08* (2006.01)
(Continued)

(52) U.S. Cl.
CPC .......... *G10L 17/22* (2013.01); *G06F 11/1458* (2013.01); *G10L 15/08* (2013.01); *G10L 15/22* (2013.01); *G10L 17/00* (2013.01); *G10L 2015/088* (2013.01); *G10L 2015/223* (2013.01)

(58) Field of Classification Search
CPC ................................. G10L 15/22; G06F 3/167
See application file for complete search history.

(56) References Cited

U.S. PATENT DOCUMENTS 10,991,371 B2 * 4/2021 Pan .......................... G10L 15/32
2007/0143115 A1 * 6/2007 Falcon .................... G10L 15/22
704/270.1

(Continued)

FOREIGN PATENT DOCUMENTS

CN       107957908 A       4/2018
CN       109151564 A  *    1/2019
(Continued)

*Primary Examiner* — Daniel Abebe
(74) *Attorney, Agent, or Firm* — Dilworth IP, LLC

(57) ABSTRACT

The embodiments of the present disclosure provide a service control method, a service control apparatus and a device, the method including: determining an application service in operating state in an electronic device; and transmitting audio data captured by a microphone to the application service and a control service, where the application service is configured to perform multimedia information interaction according to the audio data, and the control service is configured to control the electronic device according to the audio data, thereby improving flexibility in controlling services in the electronic device.

15 Claims, 5 Drawing Sheets

(51) Int. Cl.
   *G06F 11/14*   (2006.01)
   *G10L 17/00*   (2013.01)

(56) References Cited

U.S. PATENT DOCUMENTS

| | | | | |
|---|---|---|---|---|
| 2010/0185448 A1* | 7/2010 | Meisel | ............... | G10L 17/22 |
| | | | | 704/256.1 |
| 2013/0227419 A1* | 8/2013 | Lee | ............... | G06F 3/04883 |
| | | | | 715/728 |
| 2016/0293164 A1* | 10/2016 | Shi | ............... | G10L 15/1815 |
| 2018/0204569 A1* | 7/2018 | Nadkar | ............... | G10L 15/22 |
| 2019/0013019 A1* | 1/2019 | Lawrence | ............... | G06F 3/167 |
| 2020/0168216 A1* | 5/2020 | Heo | ............... | G10L 15/22 |
| 2020/0372907 A1* | 11/2020 | Trufinescu | ............... | G06F 3/167 |
| 2020/0382601 A1* | 12/2020 | Smith | ............... | H04L 67/125 |

FOREIGN PATENT DOCUMENTS

| | | |
|---|---|---|
| CN | 109151564 A | 1/2019 |
| WO | 2018177233 A1 | 10/2018 |

* cited by examiner

SERVICE CONTROL METHOD, SERVICE CONTROL APPARATUS AND DEVICE

CROSS-REFERENCE TO RELATED APPLICATION

This application claims priority to Chinese Patent Application No. 201910025214.7, filed on Jan. 11, 2019, which is hereby incorporated by reference in its entirety.

TECHNICAL FIELD

The embodiments of the present disclosure relate to the field of computer technologies, and in particular to a service control method, a service control apparatus, and a device.

BACKGROUND

At present, control services and application services are disposed in many electronic devices (such as mobile phones, computers, etc). The control services can control electronic devices based on voices. The application service can implement multimedia information interaction according to voices, for example, the application service can be a voice call service.

A microphone is usually disposed in an electronic device, and the microphone can capture audio information input by a user. The control service and the application service can be processed according to audio data captured by the microphone. In the prior art, only one service can obtain audio data from the microphone at one time, therefore, when an application service (such as a voice call service) that needs to use audio data is in operation, the control service cannot obtain the audio data from the microphone, rendering the control service unable to control the electronic device, thus resulting in poor flexibility in the service control.

SUMMARY

The embodiment of the present disclosure provides a service control method, a service control apparatus and a device, which improve flexibility in controlling services in an electronic device.

In a first aspect, the embodiment of the present disclosure provides a service control method, including:

determining, in an electronic device, an application service in operating state; and transmitting audio data captured by a microphone to the application service and a control service, where the application service is configured to perform multimedia information interaction according to the audio data, and the control service is configured to control the electronic device according to audio data.

In a possible implementation, the transmitting audio data captured by a microphone to the application service and a control service includes:

transmitting the audio data to the control service via an audio channel; and transmitting the audio data to the application service via the control service.

In a possible implementation, the transmitting the audio data to the application service via the control service includes:

obtaining backup data corresponding to the audio data via the control service, where the backup data is the same as the audio data; and transmitting the backup data to the application service via the control service.

In a possible implementation, the transmitting the backup data to the application service via the control service includes:

transmitting application data in the backup data to the application service via the control service, where the application data is data used for the multimedia information interaction.

In a possible implementation, the transmitting application data in the backup data to the application service via the control service includes:

after the control service identifies a first keyword in the audio data, suspending, by the control service, transmitting the backup data to the application service; and after the control service identifies a second keyword in the audio data, continuing, by the control service, to transmit the backup data to the application service.

In a possible implementation, the first keyword is a keyword that triggers the control service to control the electronic device, and the second keyword is a keyword that triggers the control service to suspend controlling the electronic device.

In a possible implementation, after the transmitting audio data captured by a microphone to the application service and a control service, the method further includes:

performing voice identification processing on the audio data via the control service;

after the control service identifies a first keyword in the audio data, controlling, via the control service, the electronic device according to the audio data after the first keyword until the control service identifies a second keyword in the audio data, and suspending controlling the electronic device.

In a possible implementation, the transmitting audio data captured by a microphone to the application service and a control service includes:

transmitting the audio data to the application service via a first audio channel; and transmitting the audio data to the control service via a second audio channel.

In a possible implementation, the method further includes:

when it is determined that there is no application service in operating state in the electronic device, transmitting the audio data captured by the microphone to the control service.

In a second aspect, the embodiment of the present disclosure provides a service control apparatus, including a determining module and a transmitting module, where the determining module is configured to determine, in an electronic device, an application service in operating state; and the transmitting module is configured to transmit audio data captured by a microphone to the application service and a control service, where the application service is configured to perform multimedia information interaction according to the audio data, and the control service is configured to control the electronic device according to audio data.

In a possible implementation, the transmitting module is specifically configured to:

transmit the audio data to the control service via an audio channel; and transmit the audio data to the application service via the control service.

In a possible implementation, the transmitting module is specifically configured to:

obtain backup data corresponding to the audio data via the control service, where the backup data is the same as the audio data; and transmit the backup data to the application service via the control service.

In a possible implementation, the transmitting module is specifically configured to:

transmit application data in the backup data to the application service via the control service, where the application data is data used for the multimedia information interaction.

In a possible implementation, the transmitting module is specifically configured to:

after the control service identifies a first keyword in the audio data, suspend, via the control service, transmitting the backup data to the application service, and after the control service identifies a second keyword in the audio data, continue, via the control service, to transmit the backup data to the application service.

In a possible implementation, the first keyword is a keyword that triggers the control service to control the electronic device, and the second keyword is a keyword that triggers the control service to suspend controlling the electronic device.

In a possible implementation, the apparatus further includes a voice identification module and a control module, where after the transmitting module transmits the audio data captured by the microphone to the application service and the control service, perform voice identification processing on the audio data via the control service; and the control module is configured to, after the control service identifies a first keyword in the audio data, control, via the control service, the electronic device according to the audio data after the first keyword until the control service identifies a second keyword in the audio data, and suspend controlling the electronic device.

In a possible implementation, the transmitting module is specifically configured to:

transmit the audio data to the application service via a first audio channel; and transmit the audio data to the control service via a second audio channel.

In a possible implementation, the transmitting module is further configured to, when it is determined that there is no application service in operating state in the electronic device, transmit the audio data captured by the microphone to the control service.

In a third aspect, the embodiment of the present disclosure provides a service control apparatus, including: at least one processor and a memory;

the memory stores computer execution instructions; and the at least one processor executes the computer execution instructions stored in the memory, so that the at least one processor performs the service control method as described in any one of the first aspect and the possible implementations thereof.

In a fourth aspect, the embodiment of the present disclosure provides a computer readable storage medium, where the computer readable storage medium stores computer execution instructions, and when executing the computer execution instructions, a processor implements the service control method as described in any one of the first aspect and the possible implementations thereof.

A service control method, a service control apparatus and a device are provided by embodiments of the present disclosure, where when it is determined that there is an application service in operating state in the electronic device, the electronic device transmits the audio data captured by the microphone to the application service and the control service, so that the control service can control the electronic device according to the received audio data, and the application service can perform multimedia information interaction according to the received audio data. In the above process, and specifically in the process where the application service performs multimedia information interaction according to the audio data, the control service can still control the electronic device according to the audio, which improves flexibility in controlling services in the electronic device.

BRIEF DESCRIPTION OF DRAWINGS

In order to more clearly illustrate the embodiments of the present disclosure or the technical solutions in the prior art, a brief description of the drawings used in the embodiments or the prior art will be briefly made below; obviously, the drawings in the following description are some embodiments of the present disclosure, and those skilled in the art can obtain other drawings according to the drawings without any inventive labor.

DESCRIPTION OF EMBODIMENTS

In order to make the purpose, technical solution and advantages of the embodiments of the present disclosure clearer, the technical solutions in the embodiments of the present disclosure are clearly and completely described in following with reference to the accompanying drawings in the embodiments of the present disclosure; obviously, the described embodiments are part, rather than all of the embodiments of the present disclosure. Based on the embodiments in the present disclosure, all other embodiments obtained by those skilled in the art without inventive efforts are within the scope of the present disclosure.

Figure 1A:
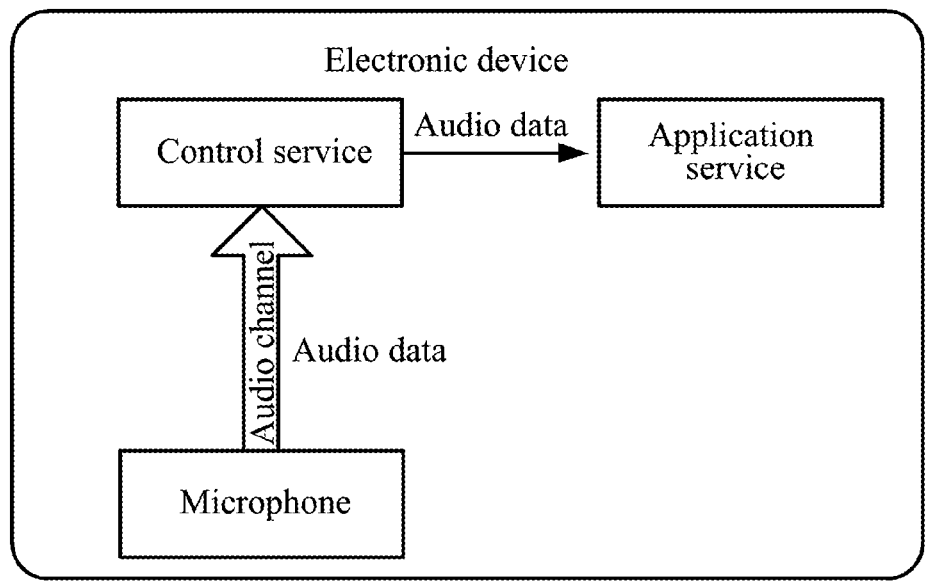
FIG. 1A is a structural diagram of a service control method provided by an embodiment of the present disclosure.
Figure 1B:
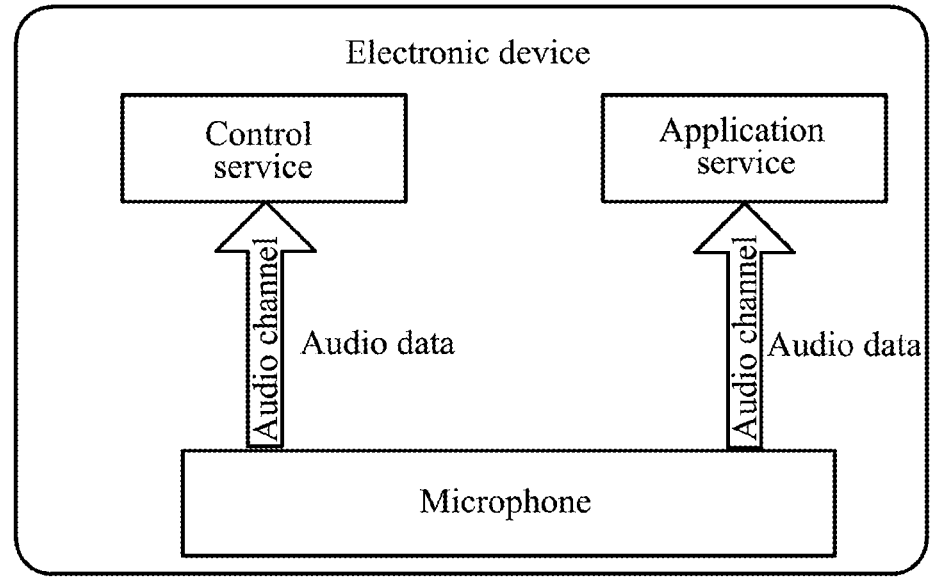
FIG. 1B is a schematic structural diagram of another service control method provided by an embodiment of the present disclosure.

FIG. 1A is a structural diagram of a service control method provided by an embodiment of the present disclosure. FIG. 1B is a schematic structural diagram of another service control method according to an embodiment of the present disclosure. With reference to FIG. 1A-FIG. 1B, a microphone, a control service, and an application service are disposed in the electronic device. The microphone can capture audio data and transmit audio data via the audio channel. The control service can control the electronic device according to the audio data captured by the microphone. Typically, the control service is always in operating state, and performs a real-time voice identification on the data captured by the microphone. After identifying and obtaining a first keyword, the control service controls the electronic device according to the audio data after the first keyword. For example, the control service may control the application service in the electronic device according to the received audio data, and for example, the control service may control the call application service in the electronic device according to the received audio data to make a call through the call application service. The control service may be, such as, an artificial intelligence assistant application. The application service can perform multimedia information interaction according to the audio data captured by the microphone. The application service may be, such as, an audio and video call service, an audio and video recording service or a singing service. In the actual application, typically, the electronic device has only one application service using the audio data and set in operating state.

With reference to FIG. 1A, an audio channel is disposed in the electronic device. The microphone transmits the captured audio data to the control service in real time via the audio channel. The control service processes the received audio data in real time. After the application service in the electronic device starts operation, the electronic device can transmit the received audio data to the application service via the control service, so that the application service performs multimedia information interaction according to the received audio data.

With reference to FIG. 1B, two audio channels are disposed in the electronic device. Since the control service is always in operating state, the microphone transmits the captured audio data to the control service in real time via an audio channel. When one application service in the electronic device is in operating state, the microphone transmits the captured audio data to the application service via another audio channel, so that the application service performs multimedia information interaction according to the received audio data.

In the present application, when it is determined that there is an application service in operating state in the electronic device, the electronic device transmits the audio data captured by the microphone to the application service and the control service, so that the control service can control the electronic device according to the received audio data, and the application service can perform multimedia information interaction according to the received audio data. In the above process, in the process where the application service performs multimedia information interaction according to the audio data, the control service can still control the electronic device according to the audio, which improves flexibility in controlling services in the electronic device.

Hereinafter, the technical solutions shown in the present application are described in detail through specific embodiments. It should be noted that, the following specific embodiments may be combined with each other, and the same or similar content will not be repeatedly described in different embodiments.

Figure 2:
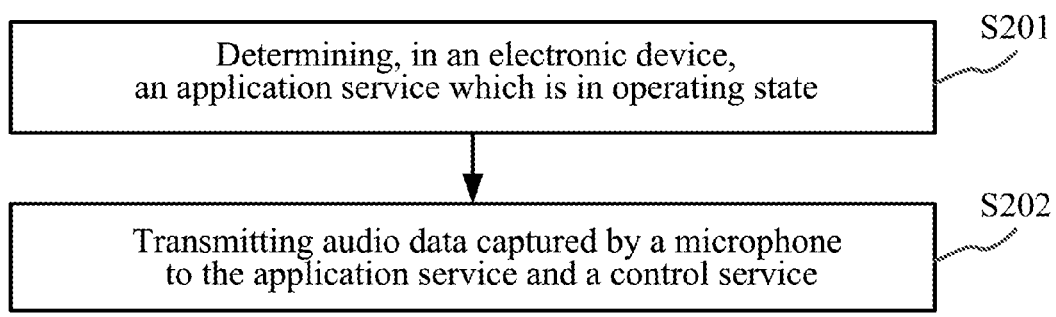
FIG. 2 is a schematic flowchart of a service control method provided by an embodiment of the present disclosure.

FIG. 2 is a schematic flowchart of a service control method provided by an embodiment of the present disclosure. With reference to FIG. 2, the method may include:

S201, determining, in an electronic device, an application service which is in operating state.

The execution body of the embodiment of the present disclosure may be an electronic device, or may be a service control apparatus disposed in the electronic device. Optionally, a service control apparatus can be implemented by software or by a combination of software and hardware.

Optionally, the electronic device may be a mobile phone, a computer, etc.

Optionally, the system of electronic device may be the Android system, IOS system, etc.

Optionally, the application service shown in the embodiment of the present disclosure refers to a service that needs to use audio data during operation, where the application service can perform multimedia information interaction according to the audio data, and the multimedia information interaction may include implementing audio calls, audio recording, audio processing, and the like.

For example, the application service may be an audio/video call service, an audio/video recording service, a karaoke service, etc.

In the actual application, typically, there is only one application service in operating state.

S202, transmitting audio data captured by a microphone to the application service and a control service.

Optionally, the control service shown in the embodiment of the present disclosure refers to a service that can control the electronic device according to the audio data.

Optionally, controlling the electronic device may include: launching an application program in the electronic device, controlling the operation of the application program in the electronic device, etc.

For example, the control service can control the call application program in the electronic device to make a call to a preset contact person. And the control service can control a camera application program in the electronic device to start operation.

Optionally, the audio data captured by the microphone can be transmitted to the application service and the control service through the following two possible implementations:

A possible implementation:

transmitting audio data to the control service via an audio channel, and transmitting the audio data to the application service via the control service.

It should be noted that, the audio data transmitted to the control service via the audio channel is the data captured by the microphone in real time. And the audio data transmitted to the application service via the control service is also the data captured by the microphone in real time.

Optionally, the audio channel may be an audio link.

Optionally, the audio data captured by the microphone may be transmitted to a Pulse Code Modulation (PCM) node, and the audio data captured by the microphone is obtained from the PCM node by the control service.

Figure 3:
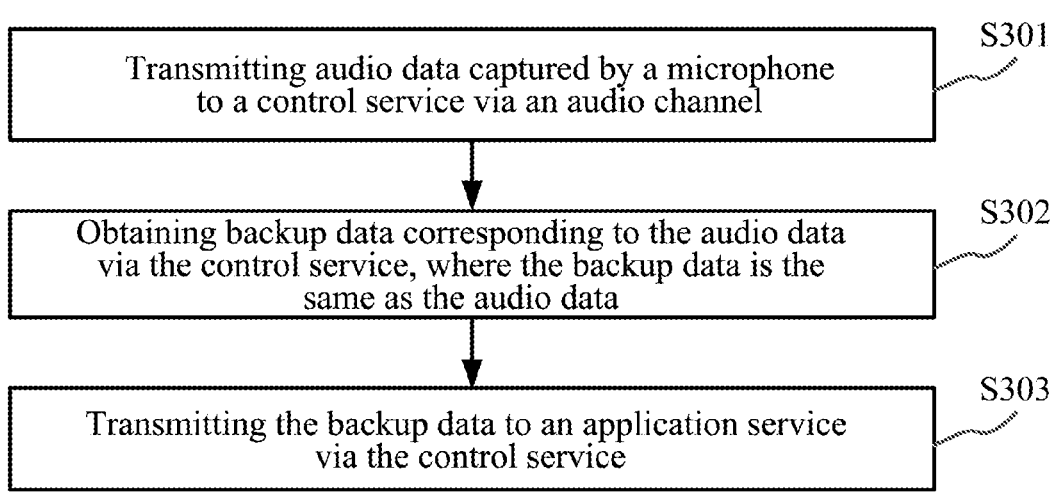
FIG. 3 is a schematic flowchart of a method for transmitting audio data to a control service and an application service provided by an embodiment of the present disclosure.

It should be noted that, in the embodiment described in FIG. 3, the possible implementation is described in detail, and details are not described herein.

Another possible implementation:

transmitting the audio data to the application service via a first audio channel; transmitting the audio data to the control service via a second audio channel.

In this possible implementation, the control service in the electronic device is always in operating state, and therefore, the electronic device transmits the data captured by the microphone to the control device in real time via the second audio channel. The application service in the electronic device is not always in operation state, and only when an application service in the electronic device is in operating state, the audio data is sent to the application service in operating state via the first audio channel.

Optionally, in the case where the electronic device is provided with the Android system, when the second service needs to perform audio recording during the process where the first service is performing audio recording through AudioRecord, the first service needs to exit since the original Android system supports only one AudioRecord for audio recording at one time, and then the second service performs audio recording. In the present application, two AudioRecords can be set, and when there are two services in the electronic device that need to perform audio recording at the same time, the audio recording can be implemented through the two AudioRecords simultaneously.

It should be noted that, when it is determined that there is no application service in operating state in the electronic device, the audio data captured by the microphone is transmitted to the control service. That is, when there is no application service in operating state in the electronic device, the audio data captured by the microphone is transmitted to only the control service.

In the service control method provided by the embodiment of the present disclosure, when it is determined that there is an application service in operating state in the electronic device, the electronic device transmits the audio data captured by the microphone to the application service and the control service, so that the control service can control the electronic device according to the received audio data, and the application service can perform multimedia information interaction according to the received audio data. In the above process, and specifically in the process where the application service performs multimedia information interaction according to the audio data, the control service can still control the electronic device according to the audio, which improves flexibility in controlling services in the electronic device.

Based on any one of the above embodiments, optionally, the audio data captured by the microphone can be transmitted to the application service and the control service through following possible implementations (S202 in the embodiment as show in FIG. 2), specifically, reference can be made to the embodiment as shown in FIG. 3.

FIG. 3 is a schematic flowchart of a method for transmitting audio data to a control service and an application service provided by an embodiment of the present disclosure. With reference to FIG. 3, the method may include the following steps.

S301, transmitting audio data captured by a microphone to a control service via an audio channel.

S302, obtaining backup data corresponding to the audio data via the control service, where the backup data is the same as the audio data.

Optionally, after receiving the audio data captured by the microphone, the control service may perform backup processing on the received audio data to obtain backup data corresponding to the audio data.

Optionally, the control service may process the audio data. For example, the control service performs voice identification processing on the audio data.

S303, transmitting the backup data to an application service via the control service.

Optionally, the application data may be determined in the backup data via the control service, and the application data in the backup data is transmitted to the application service via the control service, where the application data is data for performing multimedia information interaction.

Optionally, backup data includes control data and application data. The control data refers to data that needs to be processed by the control service, and the application data refers to data that needs to be processed by the application service.

Optionally, the control data may be data between a first keyword and a second keyword in the backup data. The application data may be data except the control data in the backup data.

Optionally, the first keyword is a keyword that triggers the control service to control the electronic device.

Optionally, the second keyword is a keyword that triggers the control service to suspend controlling the electronic device.

For example, the first keyword may be "Hey, Xiaodu", "Xiaodu, Xiaodu", "come out, Xiaodu" etc.

For example, the second keyword may be "Okay, Xiaodu", "It's enough, Xiaodu", "Let's go, Xiaodu" etc.

Optionally, the application data in the backup data can be transmitted to the application service through the control service in the following manners:

after identifying the first keyword in the audio data, the control service suspends transmitting the backup data to the application service, and after identifying the second keyword in the audio data, the control service continues to transmit the backup data to the application service.

It should be noted that, the backup data transmitted to the application service is the backup data corresponding to the audio data captured by the microphone in real time.

Optionally, after transmitting the audio data captured by the microphone to the application service and the control service, the voice data is processed via the control service; after identifying the first keyword in the audio data, the control service controls the electronic device according to the audio data after the first keyword until the control service identifies the second keyword in the audio data, and then suspends controlling the electronic device.

In the embodiment shown in FIG. 3, in the process where the control service processes the audio data (for example, voice identification), it is necessary to perform noise reduction, gain adjustment, and the like on the voice data. After the control service processes the audio data, the parameters such as the timbre, intonation, and the like of the audio data are changed, thereby causing audio distortion. By transmitting backup data of audio data to the application service, audio distortion received by the application service can be avoided.

Based on any one of the above embodiments, the service control method shown in the foregoing method embodiment is described in detail below with reference to FIG. 4.

Figure 4:
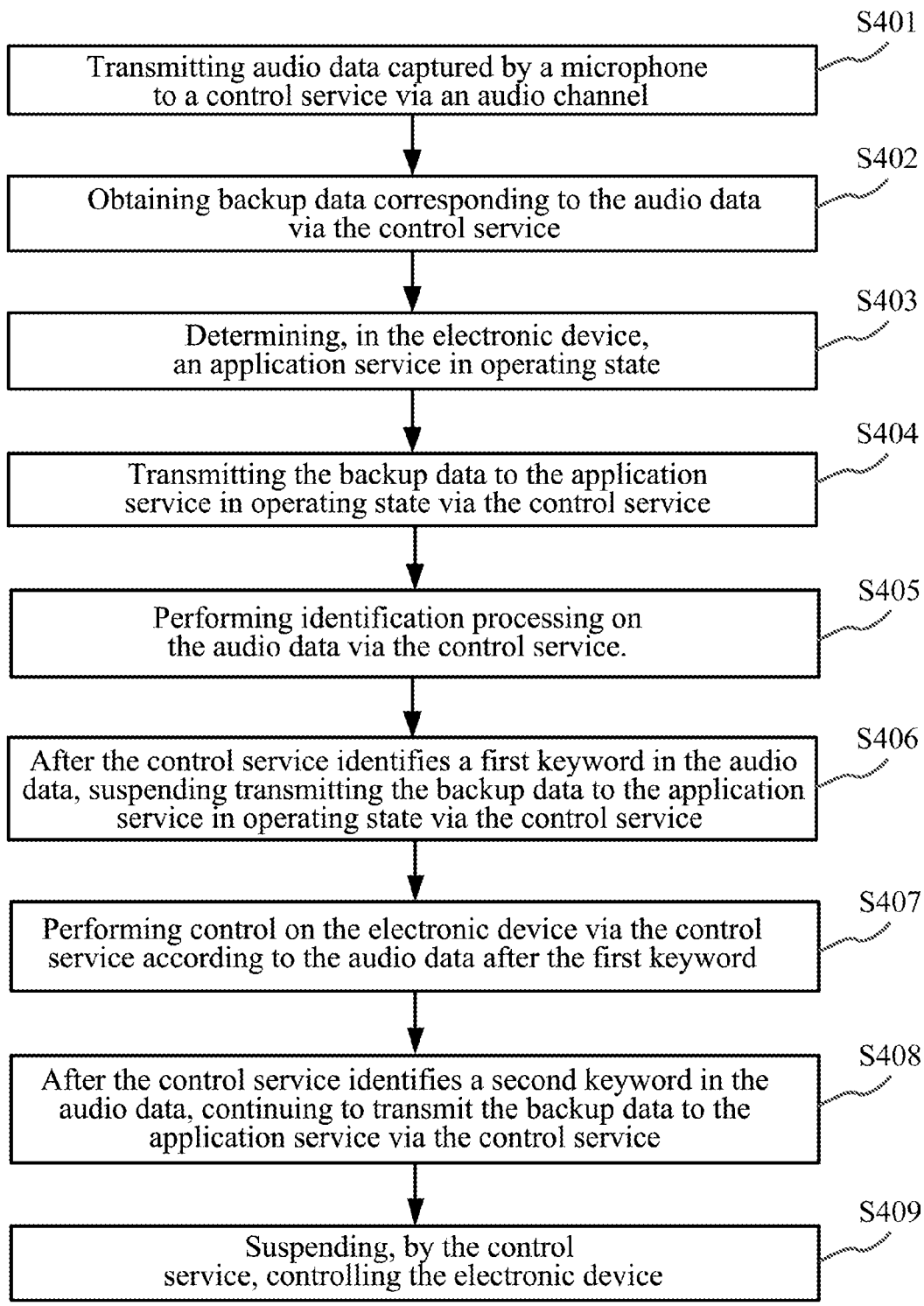
FIG. 4 is a schematic flowchart of another service control method provided by an embodiment of the present disclosure.

FIG. 4 is a schematic flowchart of another service control method according to an embodiment of the present disclosure. With reference to FIG. 4, the method may include:

S401, transmitting audio data captured by a microphone to a control service via an audio channel.

S402, obtaining backup data corresponding to the audio data via the control service.

It should be noted that, for the execution process of S402, reference can be made to the execution process of S302, thus details are not described herein.

S403, determining, in the electronic device, an application service in operating state.

It should be noted that, when it is determined that there is no application service in operating state in the electronic device, the audio data captured by the microphone is transmitted to the control service. That is, when there is no application service in operating state in the electronic device, the audio data captured by the microphone is transmitted to only the control service.

S404, transmitting the backup data to the application service in operating state via the control service.

S405, performing identification processing on the audio data via the control service.

S406, after the control service identifies a first keyword in the audio data, suspending transmitting the backup data to the application service in operating state via the control service.

S407, performing control on the electronic device via the control service according to the audio data after the first keyword.

S408, after the control service identifies a second keyword in the audio data, continuing to transmit the backup data to the application service via the control service.

S409, suspending, by the control service, controlling the electronic device.

In the embodiment shown in FIG. 4, when it is determined that there is an application service in operating state in the electronic device, the electronic device transmits the audio data captured by the microphone to the application service and the control service, so that the control service can control the electronic device according to the received audio data, and the application service can perform multimedia information interaction according to the received audio data. In the above process, and specifically in the process where the application service performs multimedia information interaction according to the audio data, the control service can still control the electronic device according to the audio, which improves flexibility in controlling services in the electronic device.

Hereinafter, the method shown in the embodiment of FIG. 4 will be described in detail by way of specific example.

Exemplarily, it is assumed that the electronic device is a mobile phone, and a microphone is disposed in the mobile phone, and the control service is Xiaodu artificial intelligence service.

In the actual application process, the microphone captures the audio data in real time and transmits the audio data to the Xiaodu artificial intelligence service. Xiaodu artificial intelligence service performs identification processing on the received audio data.

When a user needs to make a call to Xiaoming, the user can say "Xiaodu, Xiaodu, call Xiao Ming", when the Xiaodu artificial intelligence service identifies "Xiaodu, Xiaodu", it calls "Xiaoming" according to the audio data after the "Xiaodu, Xiaodu".

After the call is made to Xiaoming, the user does not need Xiaodu artificial intelligence service's control over the mobile phone, thus the user can say "Okay, Xiaodu", then the Xiaodu artificial intelligence service no longer controls the mobile phone. The Xiaodu artificial intelligence service continues to receive the audio data captured by the microphone in real time and perform identification processing on the received audio data.

After the call is got through, the Xiaodu artificial intelligence service transmits the backup data of the received audio data to the call service, and the call service can transmit the backup data to the counterpart device of the call.

When the user needs to hang up the phone, the user says "Xiaodu, hang up the phone", and when the Xiaodu artificial intelligence service identifies and obtains "Xiaodu, Xiaodu", it hangs up the phone according to the audio data "hang up the phone" after the "Xiaodu, Xiaodu". After the Xiaodu artificial intelligence service identifies the "Xiaodu, Xiaodu", the backup data corresponding to the audio data "hang up the phone" is no longer transmitted to the call service.

After hanging up the phone, the user can say "Okay, Xiaodu", then the Xiaodu artificial intelligence service no longer controls the mobile phone. After that, the Xiaodu artificial intelligence service continues to receive the audio data captured by the microphone in real time and perform identification processing on the received audio data.

Figure 5:
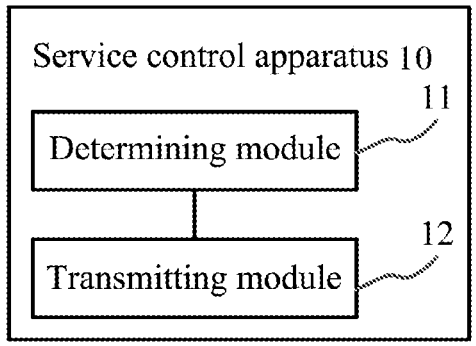
FIG. 5 is a schematic structural diagram of a service control apparatus provided by an embodiment of the present disclosure.

FIG. 5 is a schematic structural diagram of a service control apparatus according to an embodiment of the present disclosure. With reference to FIG. 5, the service control device 10 may include a determining module 11 and a transmitting module 12, where the determining module 11 is configured to determine, in the electronic device, an application service in operating state;

the transmitting module 12 is configured to transmit audio data captured by a microphone to the application service and a control service, where the application service is configured to perform multimedia information interaction according to the audio data, and the control service is configured to control the electronic device according to the audio data.

The service control apparatus provided by the embodiment of the present disclosure may perform the technical solution shown in the foregoing method embodiment. As the implementation principles and beneficial effects are similar, details are not described herein.

In a possible implementation, the transmitting module 12 is specifically configured to:

transmit the audio data to the control service via the audio channel;

transmit the audio data to the application service via the control service.

In a possible implementation, the transmitting module 12 is specifically configured to:

obtain backup data corresponding to the audio data via the control service, where the backup data is the same as the audio data; and transmit the backup data to the application service via the control service.

In a possible implementation, the transmitting module 12 is specifically configured to:

transmit application data in the backup data to the application service via the control service, where the application data is data used for multimedia information interaction.

In a possible implementation, the transmitting module 12 is specifically configured to:

after the control service identifies a first keyword in the audio data, suspend, via the control service, transmitting the backup data to the application service, after the control server identifies a second keyword in the audio data, continue, via the control service, to transmit the backup data to the application service.

In a possible implementation, the first keyword is a keyword which triggers the control service to control the electronic device, and the second keyword is a keyword which triggers the control service to suspend controlling the electronic device.

Figure 6:
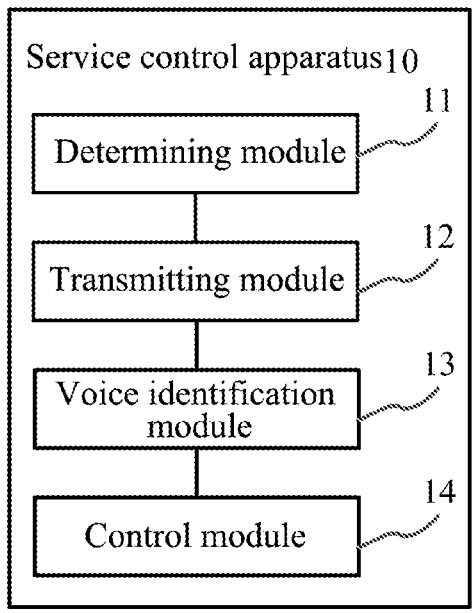
FIG. 6 is a schematic structural diagram of another service control apparatus provided by an embodiment of the present disclosure.

FIG. 6 is a schematic structural diagram of another service control apparatus according to an embodiment of the present disclosure. On the basis of the embodiment shown in FIG. 5, with reference to FIG. 6, the service control device 10 may further includes a voice identification module 13 and a control module 14, where the voice identification module 13 is configured to, after the transmitting module transmits the audio data captured by the microphone to the application service and the control service, perform voice identification processing on the audio data via the control service;

the control module 14 is configured to, after the control service identifies and obtains the first keyword in the audio data, control, via the control service, the electronic device according to the audio data after the first keyword until the control service identifies the second keyword in the audio data, and suspend controlling the electronic device.

In a possible implementation, the transmitting module 12 is specifically configured to:

transmit the audio data to the application service via a first audio channel;

transmit the audio data to the control service via a second audio channel.

In a possible implementation, the transmitting module 12 is further configured to, transmit the audio data captured by the microphone to the control service when it is determined that there is no application service in operating state in the electronic device.

The service control apparatus provided by the embodiment of the present disclosure may perform the technical solution shown in the foregoing method embodiment. As the implementation principles and beneficial effects are similar, details are not described herein.

Figure 7:
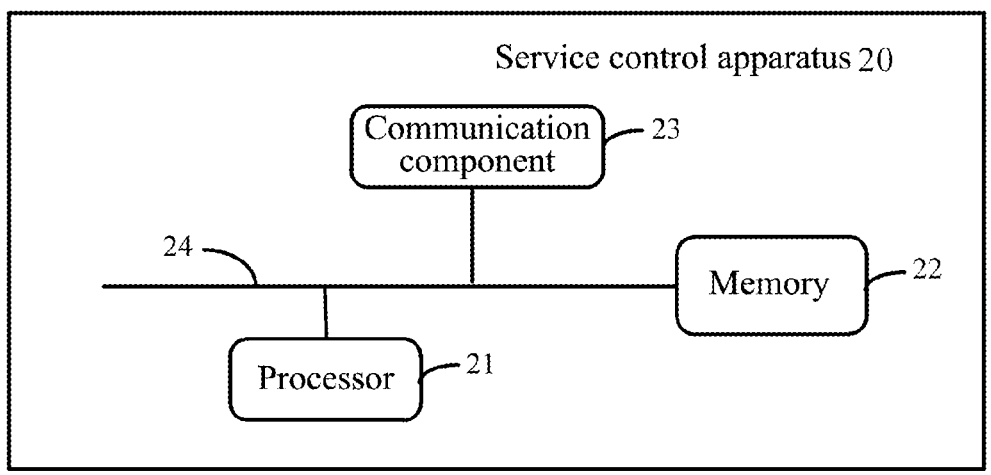
FIG. 7 is a schematic structural diagram of hardware of a service control apparatus provided by an embodiment of the present disclosure.

FIG. 7 is a schematic structural diagram of hardware of a service control apparatus provided by an embodiment of the present disclosure. As shown in FIG. 7, the service control device 20 includes: at least one processor 21 and a memory 22. Optionally, the service control device 20 further includes a communication component 23, where the processor 21, the memory 22, and the communication component 23 are connected by a bus 24.

In a specific implementation, at least one processor 21 executes computer execution instructions stored by the memory 22, so that the at least one processor 21 performs the above service control method.

For the specific implementation process of the processor 21, reference can be made to the foregoing method embodiments. The implementation principles and the technical effects are similar, which will not be repeated here in this embodiment.

In the embodiment shown in FIG. 7 above, it should be understood that the processor may be a Central Processing Unit (CPU), or may be other general purpose processor, Digital Signal Processor (DSP), Application Specific Integrated Circuit (ASIC), etc.

The general purpose processor may be a microprocessor or the processor may be any conventional processor, etc. The steps of the method disclosed in the present disclosure may be directly implemented by hardware processor, or by a combination of hardware in the processor and software modules.

The memory may include a high speed RAM memory, and may also include a non-volatile memory (NVM), such as at least one disk memory.

The bus may be an Industry Standard Architecture (ISA) bus, a Peripheral Component (PCI) bus, or an Extended Industry Standard Architecture (ESA) bus. The bus can be classified into an address bus, a data bus, a control bus, etc. For convenience of representation, the bus in the drawing of the present application is not limited to only one bus or one type of bus.

The present application further provides a computer readable storage medium, where the computer readable storage medium stores computer execution instructions, and when executing the computer execution instructions, a processor implements the service control method as described above.

The above computer readable storage medium may be implemented by any type of volatile or non-volatile storage device or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk or an optical disk. The readable storage medium can be any available medium that can be accessed by a general purpose or a special purpose computer.

An exemplary readable storage medium is coupled to the processor, such that the processor can read information from the readable storage medium and can write information to the readable storage medium. Of course, the readable storage medium can also be a part of the processor. The processor and the readable storage medium may be located in an Application Specific Integrated Circuits (ASIC). Of course, the processor and the readable storage medium may also exist as discrete components in the device.

The division of the unit is only a logical function division, and may have another division manner in the actual implementation, for example, multiple units or components can be combined or can be integrated into another system, or some features can be ignored, or not executed. In addition, the mutual coupling or direct coupling or communication connection shown or discussed may be an indirect coupling or communication connection through some interface, device or unit, and may be electrical, mechanical or otherwise.

The units described as separate components may or may not be physically separated, the components displayed as units may be or may not be physical units, that is, the components may be located in one place, or may be distributed to multiple network units. A part or all of the units may be selected according to actual needs to achieve the purpose of the solution of the embodiment.

In addition, the respective functional units in various embodiments of the present disclosure may be integrated into one processing unit, or each unit may exist physically and separately, or two or more units may be integrated into one unit.

The functions may be stored in a computer readable storage medium if implemented in the form of a software functional unit and sold or used as a standalone product. Based on such understanding, the technical solution of the present disclosure essentially, or the part that contributes to the prior art, or the part of the technical solution can be embodied in the form of a software product. The computer software product is stored in a storage medium and includes instructions for causing a computer device (which may be a personal computer, a server, a network device or the like) to perform all or part of the steps of the methods described in various embodiments of the present disclosure. The foregoing storage medium includes: a USB drive, a mobile hard disk, a Read-Only Memory (ROM), a Random Access Memory (RAM), a magnetic disk, an optical disk or other media that can store program codes.

A person of ordinary skill in the art may understand that all or a part of the steps of implementing the foregoing method embodiments may be completed by hardware related to the program instructions. The aforementioned program can be stored in a computer readable storage medium. The program, when executed, performs the steps including the foregoing method embodiments; and the foregoing storage medium includes: various media such as a ROM, a RAM, a magnetic disk, or an optical disk that can store program codes.

Finally, it should be noted that the above embodiments are only used to explain the technical solutions of the present application, and are not limited thereto; although the present disclosure has been described in detail with reference to the foregoing embodiments, those skilled in the art should understand that the technical solutions described in the foregoing embodiments may be modified, or some or all of the technical features may be equivalently substituted; however, these modifications or substitutions do not make the essence of the technical solutions depart from the scope of the technical solutions of the embodiments of the present disclosure.

What is claimed is:

1. A service control method, comprising:
   determining, in an electronic device, an application service in operating state; and
   transmitting audio data captured by a microphone to the application service and a control service, wherein the application service is configured to perform multimedia information interaction according to the audio data, and the control service is configured to control the electronic device according to audio data;
   wherein the transmitting audio data captured by a microphone to the application service and a control service comprises:
   transmitting the audio data to the control service via an audio channel; and
   transmitting the audio data to the application service via the control service.

2. The method according to claim 1, wherein the transmitting the audio data to the application service via the control service comprises:
   obtaining backup data corresponding to the audio data via the control service, wherein the backup data is the same as the audio data; and
   transmitting the backup data to the application service via the control service.

3. The method according to claim 2, wherein the transmitting the backup data to the application service via the control service comprises:
   transmitting application data in the backup data to the application service via the control service, wherein the application data is data used for the multimedia information interaction.

4. The method according to claim 3, wherein the transmitting application data in the backup data to the application service via the control service comprises:
   after the control service identifies a first keyword in the audio data, suspending, by the control service, transmitting the backup data to the application service; and
   after the control service identifies a second keyword in the audio data, continuing, by the control service, to transmit the backup data to the application service.

5. The method according to claim 4, wherein the first keyword is a keyword that triggers the control service to control the electronic device, and the second keyword is a keyword that triggers the control service to suspend controlling the electronic device.

6. The method according to claim 1, wherein after the transmitting audio data captured by a microphone to the application service and a control service, the method further comprises:
   performing voice identification processing on the audio data via the control service;
   after the control service identifies a first keyword in the audio data, controlling, via the control service, the electronic device according to the audio data after the first keyword until the control service identifies a second keyword in the audio data, and
   suspending controlling the electronic device.

7. The method according to claim 1, wherein the method further comprises:
   when it is determined that there is no application service in operating state in the electronic device, transmitting the audio data captured by the microphone to the control service.

8. A computer readable storage medium, wherein the computer readable storage medium stores computer execution instructions, and when executing the computer execution instructions, a processor implements the service control method according to claim 1.

9. A service control apparatus, comprising at least one processor and a memory;
   the memory stores computer execution instructions; and
   when executed by the at least one processor executes, the computer execution instructions cause the processor to
   determine, in an electronic device, an application service in operating state; and
   transmit audio data captured by a microphone to the application service and a control service, wherein the application service is configured to perform multimedia information interaction according to the audio data, and the control service is configured to control the electronic device according to audio data;
   wherein the computer execution instructions further cause the processor to:
   transmit the audio data to the control service via an audio channel; and
   transmit the audio data to the application service via the control service.

10. The apparatus according to claim 9, wherein the computer execution instructions further cause the processor to:
    obtain backup data corresponding to the audio data via the control service, wherein the backup data is the same as the audio data; and
    transmit the backup data to the application service via the control service.

11. The apparatus according to claim 10, wherein the computer execution instructions further cause the processor to:
    transmit application data in the backup data to the application service via the control service, wherein the application data is data used for the multimedia information interaction.

12. The apparatus according to claim 11, wherein the computer execution instructions further cause the processor to:
    after the control service identifies a first keyword in the audio data, suspend, via the control service, transmitting the backup data to the application service, and
    after the control service identifies a second keyword in the audio data, continue, via the control service, to transmit the backup data to the application service.

13. The apparatus according to claim 12, wherein the first keyword is a keyword that triggers the control service to control the electronic device, and the second keyword is a keyword that triggers the control service to suspend controlling the electronic device.

14. The apparatus according to claim 9, wherein the computer execution instructions further cause the processor to:
- after the transmitting the audio data captured by the microphone to the application service and the control service, perform voice identification processing on the audio data via the control service; and
- after the control service identifies a first keyword in the audio data, control, via the control service, the electronic device according to the audio data after the first keyword until the control service identifies a second keyword in the audio data, and suspend controlling the electronic device.

15. The apparatus according to claim 9, wherein
the computer execution instructions further cause the processor to, when it is determined that there is no application service in operating state in the electronic device, transmit the audio data captured by the microphone to the control service.

* * * * *